J. R. NEFF.
DISK HARROW.
APPLICATION FILED MAR. 31, 1910. RENEWED APR. 10, 1911.
994,650.
Patented June 6, 1911.
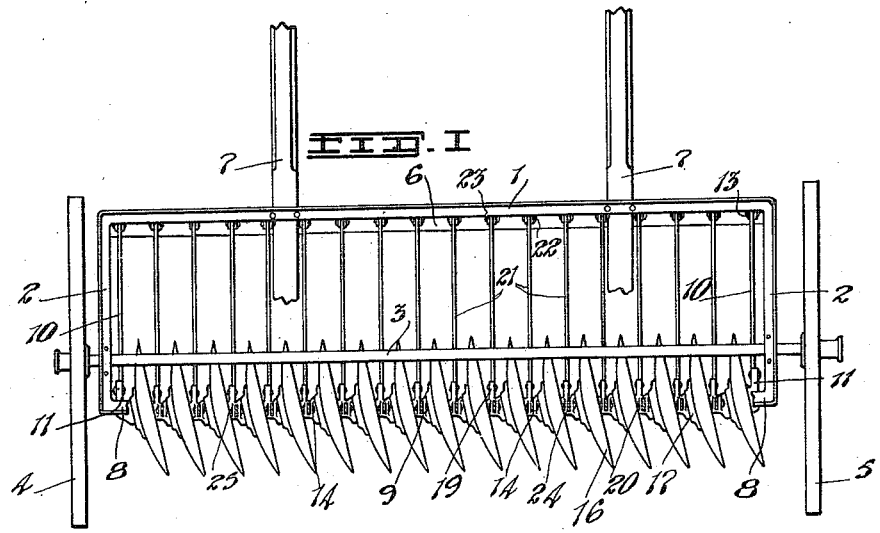
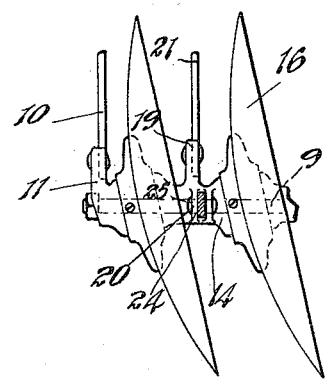
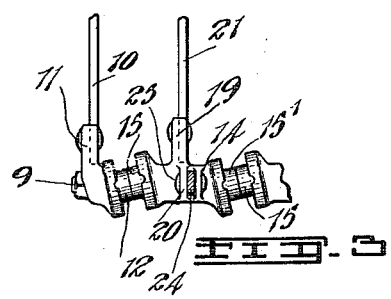
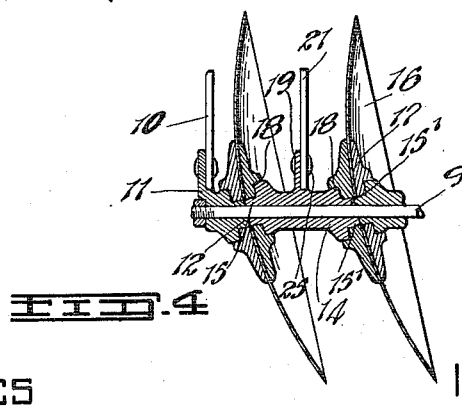
WITNESSES
Jas. M. Gapley
G. Thomson
INVENTOR
JOHN. R. NEFF
By Fred Halverstenbergh, Atty

UNITED STATES PATENT OFFICE.

JOHN RYERSON NEFF, OF MOOSOMIN, SASKATCHEWAN, CANADA.

DISK HARROW.

994,650. Specification of Letters Patent. Patented June 6, 1911.

Application filed March 31, 1910, Serial No. 552,726. Renewed April 10, 1911. Serial No. 620,021.

*To all whom it may concern:*

Be it known that I, JOHN RYERSON NEFF, of the town of Moosomin, in the Province of Saskatchewan, Canada, have invented certain new and useful Improvements in Disk Harrows, of which the following is the specification.

My invention relates to disk harrows, and the object of the invention is to provide a device of this class which will treat the soil on which it is operating evenly, cutting into the soil at the same depth at all points.

A further object is to provide a machine embodying a disk supporting cross shaft which is placed at right angles with respect to the line of advancement of the machine, the disks being mounted so as to rotate in a plane inclined to the ground.

The invention consists essentially in a suitable wheeled frame, a shaft passing across the frame and swingably secured thereto, axle forming sleeves on the shaft, means swingably securing the sleeves to the frame, and disks rotatably mounted on the axles, the parts being arranged and constructed as hereinafter more particularly described.

Figure 1 is a plan view of a wheeled frame showing my invention applied. Fig. 2 is an enlarged detailed plan view of one end of the main cross shaft showing two of the disks in position. Fig. 3 is an enlarged detailed plan view of a portion of the main or cross shaft showing the construction of the sleeves. Fig. 4 is an enlarged detailed horizontal sectional view through the disks and shaft as they appear in Fig. 2.

In the drawings like characters of reference indicate corresponding parts in each figure.

1 represents the frame of the machine which has its ends 2 turned backwardly and carried by a cross shaft 3 on which are mounted the carriage wheels 4 and 5. Attached to the frame 1 is a beam 6 from which extends the usual tongues 7. A cross bar 8 is carried rearwardly by the ends 2 of the frame 1.

The parts as above described can be of any desired construction as they are only in which I propose to construct a complete shown to give a general idea of the manner in which I propose to construct a somplete harrow, it being understood that the invention resides almost entirely in the manner and not in the manner in which the shaft is attached or carried by the frame.

9 is the disk carrying shaft swingably secured to the frame 1 by means of bars 10 which carry rearwardly bearings 11 which are bored to receive the ends of the shaft and are fitted with facially projecting axle forming members 12, the axes of which are located in the horizontal plane and are set at an angle to the axis of the shaft. The forward ends of the bars 10 are pivotally held by suitable bolts to lugs 13 carried by the frame. Upon the shaft 9 I have placed similar sleeves 14 having each facially projecting axle forming members 15 15' at the ends thereof, the axes of which are in the horizontal plane and intersect or are set at an angle to the axis of the shaft. When the sleeves are in position on the shaft the adjoining members 15 and 15' of adjacent sleeves are designed to butt together and form an axle for the disks, later referred to, to rotate upon. It is further to be understood that the members 12 of the bearings 11 abut the similarly formed members of the end sleeves 14 forming with them axles for the disks.

16 are disks of the usual form provided with the usual hubs 17 which are bored to receive the axles formed on the sleeves. The hubs are reamed out at 18 to receive the sleeves and end bearings and protect the axles from dust, sand, and other such undesirable foreign material. Each sleeve is provided centrally with more or less horizontally extending arms 19 and upwardly directed lugs 20. Bars 21 pass from the arms 19 to the frame 1 to which they are swingably secured by bolts 22 carried by lugs 23.

24 are bars pivotally secured to the lugs 20 by rivets or bolts 25. The bars 24 pass upwardly to the rear cross bar 8 of the frame and are utilized for pressing the sleeves downwardly or raising them as the case may be to increase or decrease the depth at which the disks cut.

I have not described the mechanism utilized for raising or lowering the arms 24 as any well known construction can be employed such as is at present used in many seeding machines already on the market.

It will be seen that the axles have to be formed from two members as it will be impossible otherwise to place the disks on the shaft.

What I claim as my invention is:

1. In a disk harrow, the combination with a supporting shaft, of adjoining sleeves located on the shaft, said sleeves having opposing facial projecting axle forming members extending therefrom, such axle forming members being continuous when the sleeves are brought together and having their axis intersecting the axis of the shaft, and a disk rotatably mounted on the axle forming members, as and for the purpose specified.

2. In a disk harrow, the combination with a main shaft, of similar sleeves located on the shaft, such sleeves having their ends extending in axle forming members when brought together, the axes of said members being in the horizontal plane and intersecting the axis of the shaft, disks rotatable on the axle forming member, and hubs secured to the disks and overhanging the adjoining edge of the sleeves, as and for the purpose specified.

3. In a disk harrow, the combination with a substantially rectangular open sided wheeled frame, of bars pivotally secured to the forward member of the frame and extending rearwardly, sleeves permanently secured to the arms, a cross shaft passing through the sleeves and holding them together, said sleeves having their adjoining ends extending and forming axles with their axes in the horizontal plane and intersecting the axis of the shaft, disks carrying hubs rotatably mounted on the axles formed by the sleeves said hubs being reamed out to receive the sleeves, and means for adjusting the position of the shaft, as and for the purpose specified.

Signed at Winnipeg, in the Province of Manitoba, this 22nd day of January 1910.

JOHN RYERSON NEFF.

In the presence of—
  G. S. ROXBURGH,
  M. A. SOMERVILLE.

---

Copies of this patent may be obtained for five cents each, by addressing the "Commissioner of Patents, Washington, D. C."